United States Patent Office 3,574,186
Patented Apr. 6, 1971

3,574,186
PROCESS FOR MAKING 7-CHLORO-7-DEOXYL-INCOMYCIN AND RELATED COMPOUNDS AND NOVEL INTERMEDIATES PRODUCED THEREIN
Robert D. Birkenmeyer, Comstock Township, Kalamazoo County, and Fred Kagan, Kalamazoo, Mich., assignors to The Upjohn Company, Kalamazoo, Mich.
No Drawing. Continuation-in-part of application Ser. No. 696,513, Jan. 9, 1968. This application Oct. 8, 1969, Ser. No. 864,893
Int. Cl. C07c 47/18
U.S. Cl. 260—210
22 Claims

ABSTRACT OF THE DISCLOSURE

Compounds of the formula:

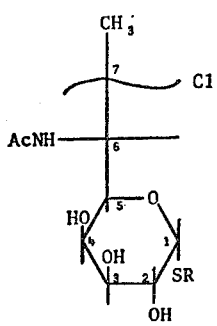

I are prepared by replacing by chlorine, the 7-hydroxy of a compound of the formula:

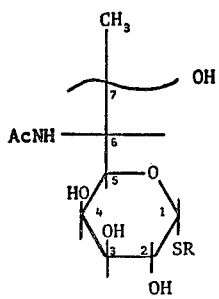

II

The replacement is effected by (1) mixing the starting compound of Formula II with thionyl chloride, (2) heating with thionyl chloride, and (3) hydrolysis.

Thionyl chloride without heating converts the compounds of Formula II to a 3,4-O-cyclic sulfite of the formula:

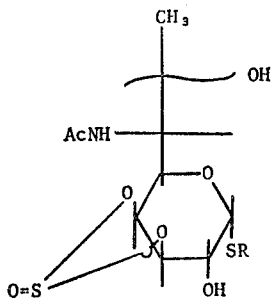

III

Heating with thionyl chloride converts compounds of Formulas II and III to a 3,4-O-cyclic sulfite of the formula:

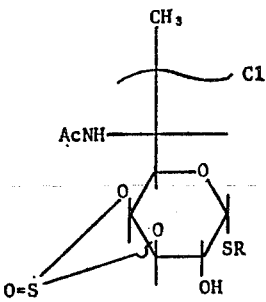

IV and a bis-sulfite of the formula:

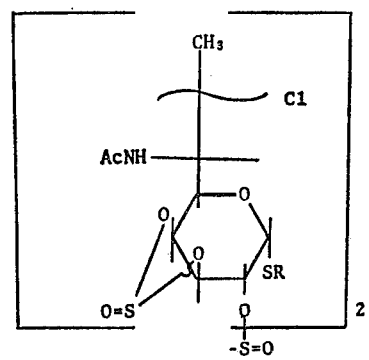

V

Solvolysis converts compounds of Formulas IV and V to a 7-chloro-7-deoxylincomycin of Formula I.

CROSS REFERENCES TO RELATED APPLICATIONS

This application is a continuation in part of our co-pending application Ser. No. 696,513, filed January 9, 1968, now abandoned, which in turn is a continuation in part of our application Ser. No. 511,288, filed December 1, 1965, now abandoned, which in turn is a continuation in part of our application Ser. No. 431,184, filed February 8, 1965, now abandoned. It is also a continuation in part of our co-pending applications Ser. No. 587,662, filed October 19, 1966, now abandoned, and Ser. No. 696,518, filed January 9, 1968, now U.S. Patent 3,496,163.

BRIEF SUMMARY OF INVENTION

This invention relates to a novel process and is particularly directed to a process for preparing compounds of the formula:

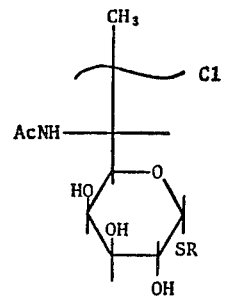

I by replacing by chlorine, the 7-hydroxy of a compound of the formula:

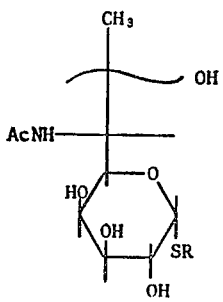

II

The replacement is effected by (1) mixing the starting compound of Formula II with thionyl chloride, (2) heating with thionyl chloride, and (3) solvolysis.

Thionyl chloride without heating converts the compounds of Formula II to a 3,4-O-cyclic sulfite of the formula:

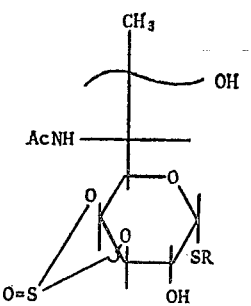

(III)

Heating with thionyl chloride converts compounds of Formulas II and III to a 3,4-O-cyclic sulfite of the formula:

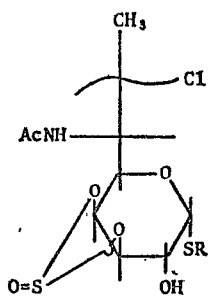

(IV)

and a bis-sulfite of the formula:

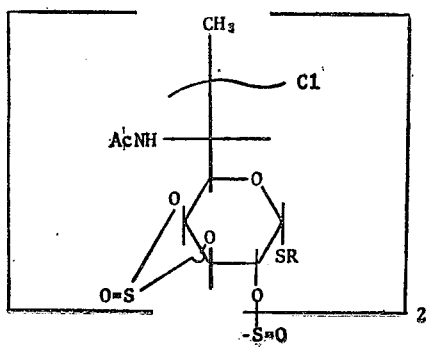

(V)

Solvolysis converts compounds of Formulas IV and V to a 7-chloro-7-deoxylincomycin of the formula:

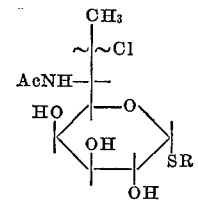

I

In the process Ac can be hydrogen or carboxyacyl and R the radical of a mercaptan. Advantageously, both Ac and R are non-reactive with thionyl chloride. Preferably R is alkyl of not more than 20 carbon atoms, advantageously not more than 8 carbon atoms, cycloalkyl of from 3 to not more than 8 carbon atoms, and aralkyl of not more than 12 carbon atoms, advantageously not more than 8 carbon atoms; and Ac is a carboxyacyl radical, advantageously the acyl radical of a 4-substituted-L-2-pyrrolidinecarboxylic acid of the formula:

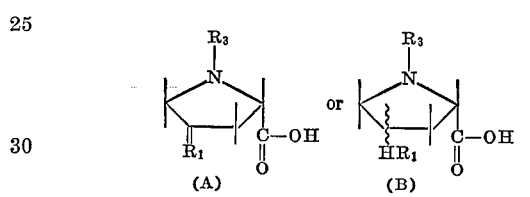

wherein $R_1$ is alkylidene of not more than 20 carbon atoms (including methylene), advantageously not more than 8 carbon atoms, cycloalkylidene of from 3 to not more than 8 carbon atoms, and aralkylidene of not more than 12 carbon atoms, advantageously not more than 8 carbon atoms; and $R_3$ is alkyl of not more than 20 carbon atoms, advantageously not more than 2 carbon atoms. Ac can also be —H·HX wherein X is an anion. Ac can also be an acyl radical of a 4-substituted-L-2-pyrrolidinecarboxylic acid of the formula:

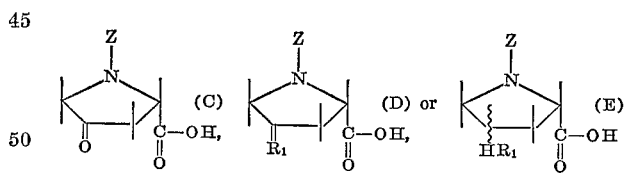

wherein Z is a protective group which can be removed by hydrogenolysis or solvolysis.

Examples of alkyl of not more than 20 carbon atoms (R, HR, and $R_3$) are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof. Examples of cycloalkyl are cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl. Examples of aralkyl are benzyl, phenethyl, 3-phenylpropyl, and 1-naphthylmethyl. Examples of alikylidene, cycloalkylidene, and aralkylidene groups ($R_1$) include methylene, ethylidene, propylidene, butylidene pentylidene, hexylidene, heptylidene, octylidene, nonylidene, decylidene, undecylidene, dodecylidene, tridecylidene, tetradecylidene, pentadecylidene, hexadecylidene, heptadecylidene, octadecylidene, nonadecylidene, eicosylidene, and the isomeric forms thereof, cyclopropylidene, cyclobutylidene, cyclopentylidene, cyclohexylidene, cycloheptylidene, cyclooctylidene, 2 - cyclopropylethylidene, 3-cyclopentylpropylidene, benzylidene, 2-phenylethylidene, 3-phenylpropylidene, and 1-napthylmethylene.

The HR$_1$— group can be in either the cis or trans position as illustrated in the following formulas:

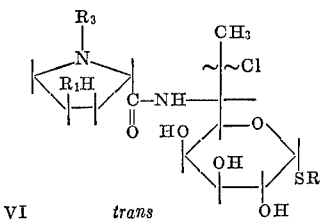

VI    trans and

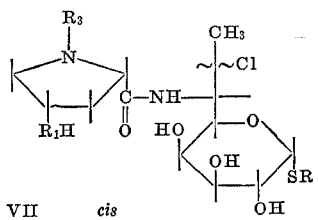

VII    cis

If desired, the cis and trans isomers can be separated by counter current distribution or chromatography either before or after replacement of the 7-hydroxy group by chlorine.

When R$_3$ in Formulas B, IB, and IIB is hydrogen (Formulas IB and IIB are, respectively, Formulas I and II wherein Ac is the acyl of acid B), it can be replaced by suitable alkylation or like procedure. Advantageously, this replacement is effected by reacting the compound according to Formula B, IB, or IIB, wherein R$_3$ is hydrogen with an oxo compound (an aldehyde or a ketone) and hydrogenating the resulting adduct with a catalyst effective to saturate an olefinic double bond. Either platinum or palladium can be used as the catalyst. Suitable oxo compounds have the formula R$_4$R$_5$CO where R$_4$R$_5$C= is the same as R$_2$ given above. Examples of suitable oxo compounds are formaldehyde, acetaldehyde, propionaldehyde, butyraldehyde, acetone, isobutyl methyl ketone. The same applies when R$_3$ in Formulas A, IA, and IIA is hydrogen. In such case, however, hydrogenation in the presence of a platinum or palladium catalyst would tend to convert R$_1$— to HR$_1$—. If it is desired to keep R$_1$— intact, alkylation can be effected with an alkyl iodide, for example, methyl or ethyl iodide.

DETAILED DESCRIPTION

The starting compounds of Formula II wherein Ac is acyl are prepared by acylating a compound of the formula:

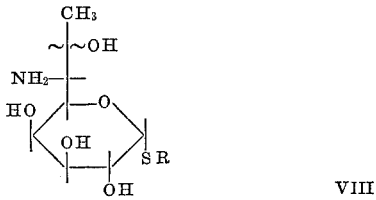

VIII wherein R is as given above, with a 4-substituted-L-2-pyrrolidine-carboxylic acid of Formula A or B. This acylation and like acylations referred to herein can be effected by procedures already well known in the art for acylating amino sugars.

The starting acid of Formula A can be prepared by reacting a 4-oxo compound of the formula:

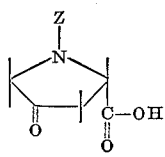

C wherein Z is a protective group which is removable by hydrogenolysis or solvolysis, with a Wittig agent as more particularly described in U.S. Patent 3,380,992. Suitable such protective groups are trityl, i.e., triphenylmethyl, diphenyl(p-methoxyphenyl)methyl, bis-(p-methoxyphenyl)phenylmethyl, benzyl, or p-nitrobenzyl, and hydrocarbyloxycarbonyl groups. Examples of the latter are tertiary-butoxycarbonyl; benzyloxycarbonyl groups of the formula:

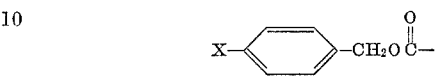

wherein X is hydrogen, nitro, methoxy, chloro, or bromo, for example, carbobenzoxy, p-nitrocarbobenzoxy, p-bromo-, and p-chlorocarbobenzoxy; and phenyloxycarbonyl groups of the formula:

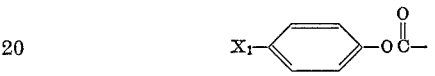

wherein X$_1$ is hydrogen, allyl, or alkyl of not more than 4 carbon atoms, such as phenyloxycarbonyl, p-tolyloxycarbonyl, p-ethylphenyloxycarbonyl, and p-allylphenyloxycarbonyl and the like.

Compound C is thus converted to a compound of the formula:

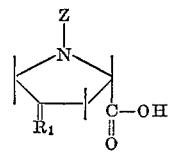

D which on hydrogenation in the presence of a catalyst, e.g., platinum, which is effective to saturate a double bond, but which is ineffective to effect hydrogenolysis, is converted to a compound of the formula:

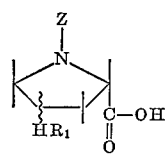

E

If desired, the starting compounds of Formula II can be acylated with acids of Formula C, D, or E to form compounds IIC, IID, and IIE, respectively. Compound IIC can then be converted to compound IID by treatment with a Wittig reagent and compound IID hydrogenated to compound IIE by the procedures given above. The hydrogenation, both of the acid D and the acylate IID, gives a mixture of cis and trans which, if desired, can be separated by counter current distribution or chromatography. The starting acids of Formula B in which R$_3$ is hydrogen are obtained when an acid of Formula D or E is subjected to hydrogenolysis over a palladium catalyst, e.g., palladium on carbon. Likewise, compounds of Formulas IID and IIE are converted to compounds of Formula IIB in which R$_3$ is hydrogen by the same process. The starting acids of Formula B in which R$_3$ is hydrogen as well as compounds of Formula IIB in which R$_3$ is hydrogen can be converted respectively to compounds of Formulas B and IIB in which R$_3$ is HR$_2$ by the procedures given above. Other starting acids of Formula A or Formula B are obtained by treating an acid of Formula D or Formula E with hydrogen bromide in acetic acid to remove the Z group and then replacing the N-hydrogen with an HR$_2$ group by the procedure given above. Compounds of Formulas IID and IIE are converted to compounds of Formulas IIA and IIB, respectively, by the same process.

Also where Z is removable by hydrolysis, for example, when Z is tertiary-butoxycarbonyl, compounds of Formulas I and II where Ac is the acyl of the acid of Formula D are converted by hydrolysis to compounds of Formulas I and II wherein Ac is the acyl of acid A where $R_3$ is hydrogen.

Any and all of the compounds described in U.S. Pat. 3,380,992 can be converted to the corresponding 7-chloro-7-deoxy compound by the process of the invention.

The mechanism by which thionyl chloride effects the substitution of the 7-hydroxy by chlorine is not fully understood. The mechanism is such that a change in configuration results. Thus, a 7(R)-hydroxy compound of the D-erythro configuration yields a 7(S)-chloro compound of the L-threo configuration. For example, 7(S)-chloro-7-deoxylincomycin which is derived from lincomycin (lincomycin has the D-erythro configuration), has the L-threo configuration. It has been tentatively established, however, that the process goes through a series of intermediates in accordance with the following sequence:

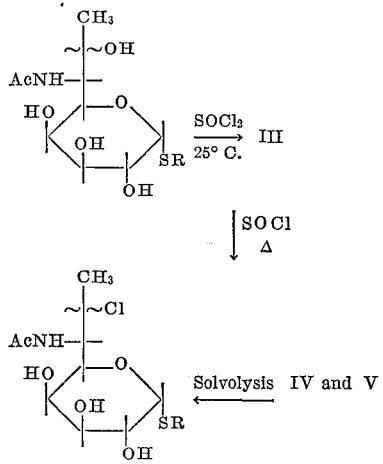

wherein Ac and R are as given above. Intermediate III is the 3,4-cyclic sulfite of the starting material II and has the formula given above. Intermediate IV is the corresponding 3,4-cyclic sulfite of the 7-chloro compound (Formula I) and is represented by Formula IV above. Intermediate V may be a bis-sulfite of the 3,4-cyclic sulfite of the 7-chloro compound and is represented by the Formula V above.

If desired, each of the three intermediates, III, IV, and V can be isolated during the course of the reaction. All that is necessary, however, to effect the substitution of the 7-hydroxy by chlorine is to mix the starting compound of Formula II or VIII, advantageously in the form of an acid-addition salt, e.g., the hydrochloride, with thionyl chloride, advantageously in the presence of an inert solvent, with mild heating, advantageously at reflux temperature, until the desired substitution of the 7-hydroxy group by chlorine is effected. Advantageously, the reaction is carried out in an inert atmosphere, e.g., under nitrogen. Carbon tetrachloride can be used effectively as the solvent vehicle but other inert solvents such as chloroform, methylene chloride, ethylene chloride, ether, benzene, and the like can be used. A satisfactory procedure is to stir the reaction mixture at room temperature for a considerable period, say from about 1 to 18 hours or as long as necessary to obtain a reasonably clear solution and then to raise the temperature to between about 50° to 100° C., for example, to the reflux temperature (77° C. for carbon tetrachloride). After the reaction is complete, usually after heating at reflux for about 1 to 5 hours, the reaction mixture is allowed to cool, advantageously under nitrogen. Any material that separates on the cooling is collected and dried. The solvent is removed by vacuum distillation at a pot temperature advantageously less than about 35° C. and the material which precipitates is collected and dried and treated to remove sulfite from the intermediate products. The collected material can then be further purified by solvent extraction and/or recrystallization and can be recovered either as the free base or an acid addition salt.

Removal of the sulfite is effected by solvolysis, for example by hot water, hot dilute hydrochloric acid, or hot ethanol or like alkanol, or simply by adjusting the pH to about pH 11 with NaOH or like base. The base catalyzed hydrolysis proceeds effectively without heating and for this reason is of particular advantage.

The proportions of the reagents can be varied widely. Stoichiometrically, however, at least 3 moles of thionyl chloride is required for each mole of starting compound. Any larger amount can be used but ordinarily it is not necessary or desirable to use more than about a 10 fold excess. Advantageously, an excess of about 2 to 3 fold is used. The amount of solvent is not critical and can be varied widely in accordance with the practices in the art. Ordinarily from about 15 to about 30 volumes of solvent for each part of solid starting compound will suffice. The proportion of solvent to thionyl chloride, however, is important because of the solubility of the product in thionyl chloride. If the ratio of solvent to thionyl chloride (v./v.) is high, the desired product precipitates on cooling of the reaction mixture and the work up of the product is simplified. For example, with carbon tetrachloride a mixture of products precipitates directly on cooling the reaction mixture if the v./v. proportion of carbon tetrachloride to thionyl chloride is kept above about 10 to 1.

The compounds of Formulas IA, IB, IIA, IIB, and VIII exist either in the protonated or non-protonated forms according to the pH of the environment. When the protonated form is intended the compound is qualified as an acid-addition salt and when the non-protonated form is intended it is qualified as the free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, chloic, palmitic, mucic, camphoric, glutaric, glycolic, phthalic, tartaric, lauric, stearic, salicylic, 3-phenylsalicyclic, 5-phenylsalicyclic, 3-methylglutaric, orthosulfobenzoic, cyclopentanepropionic, 1,2 - cyclohexanedicarboxylic, 4-cyclohexanecarboxylic, octadecenylsuccinic, octenylsuccinic, methanesulfonic, benzenesulfonic, helianthic, Reinecke's, dimethyldithiocarbamic, cyclohexylsulfamic, hexadecylsulfamic, octadecylsulfamic, sorbic, monochloroacetic, undecylenic, 4'-hydroxyazobenzene-4-sulfonic, octodecylsulfuric, picric, benzoic, cinnamic, and like acids.

The acid-addition salts can be used for the same purposes as the free base or they can be employed to upgrade the same. For example, the free base can be converted to a water-soluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate, and the aqueous solution of the salt extracted with various water-immiscible solvents before regenerating the free base form by treatment of the thus-extracted acid solution or converted to another salt by metathesis. The free bases of Formulas IA, IB, IIA, IIB, and VIII can be used as buffers or as antacids. The compounds of Formulas I, II, and VIII react with isocyanates to form urethanes and can be used to modify polyurethane resins. The long chain compounds, i.e., where $R_3$ is alkyl of from 8 carbon atoms up, have surface active properties and can be used as wetting and emulsifying agents. The thiocyanic acid addition salt when condensed with formaldehyde forms resinous materials useful as pickling inhibitors according to U.S. Pats. 2,425,320 and 2,606,155. The free bases also make good vehicles for toxic acids. For example, the fluosilicic acid addition salts are useful as mothproofing agents according to U.S. Pats. 1,915,334 and 2,075,359 and the hexafluoroarsenic acid and hexafluorophosphoric acid addition salts are useful as parasiticides according to U.S. Pats. 3,122,536 and 3,122,552.

The close analogues of 7-chloro-7-deoxylincomycin, i.e., where —$R_1H$ is cis or trans alkyl of not more than 8 carbon atoms; $R_3$ is methyl or ethyl; R is alkyl of not more than 8 carbon atoms, have antibacterial properties, and some are comparable or superior to lincomycin and can be used for the same purposes as lincomycin. The corresponding compounds where $R_3$ is hydrogen have like antibacterial properties and moreover, have improved Gram-negative activity and antimalarial activity. The other analogues and isomers have similar antibacterial properties but to a lesser degree and can be used for the same purposes as lincomycin where larger amounts are not objectionable.

The following examples are illustrative of the process and products of the present invention but are not to be construed as limiting. The parts and percentages are by weight and the solvent ratios are by volume unless otherwise specified.

EXAMPLE 1

7(S)-chloro-7-deoxylincomycin [methyl 7-chloro-6,7,8-trideoxy-6-(trans-1-methyl - 4 - propyl-L-2-pyrrolidine-carboxamido) - 1 - thio - L - threo - α - D - galacto-octopyranoside]

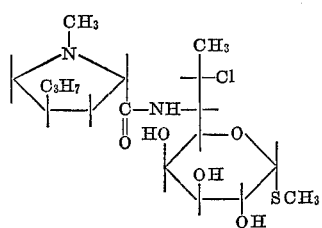

IX

(A) THE FREE BASE

A suspension of 221.0 g. (0.5 mole) of lincomycin hydrochloride in 5 l. of carbon tetrachloride was stirred well at 25° C. under nitrogen. 900 ml. of thionyl chloride was added all at once and stirring continued for 2 hr. During this period the solid dissolved and a clear solution was obtained. The reaction mixture was heated at reflux for 2 hr., the heat source then removed and nitrogen bubbled into the amber solution until the pot temperature dropped to 25° C. About 4 l. of liquid was removed via vacuum distillation at a pot temperature of less than 35°. The yellow solid which precipitated during this distillation was collected and dried. This solid was dissolved in about 300 ml. of methanol, cooled at 25°, made basic (pH 11) with dilute aqueous sodium hydroxide solution (2 N), diluted to about 1200 ml. with water and extracted well with ether. The ether extracts were combined, washed with a small amount of water, dried over anhydrous magnesium sulfate and filtered. On evaporation of an aliquot of the combined ether extract 7(S)-chloro-7-deoxylincomycin free base is obtained as a yellow amorphous solid.

(B) THE HYDROCHLORIDE

Addition of hydrogen chloride gas to the filtrate of part A resulted in the precipitation of 7(S)-chloro-7-deoxylincomycin hydrochloride which was separated and recrystallized from ethanol and ethyl acetate. A 32% yield of white, crystalline 7(S)-chloro-7-deoxylincomycin hydrochloride solvated with approximately one molecular proportion of water was obtained.

Analysis.—Calcd. for $C_{18}H_{32}ClN_2O_5S \cdot HCl \cdot H_2O$ (percent): C, 45.18; H, 7.37; Cl, 14.82; N, 5.86; S, 6.70; $H_2O$, 3.77. Found (percent): C, 44.70; H, 7.65; Cl, 14.27; N, 5.78; S, 6.45; $H_2O$, 3.85.

$[\alpha]_D^{H_2O}$ +130° (C. 0.9858 g./100 ml.)

Activity: About 4 to 8 times lincomycin.

Antibacterial spectrum: Same as lincomycin.

EXAMPLE 2

Lincomycin 3,4-O-cyclic sulfite

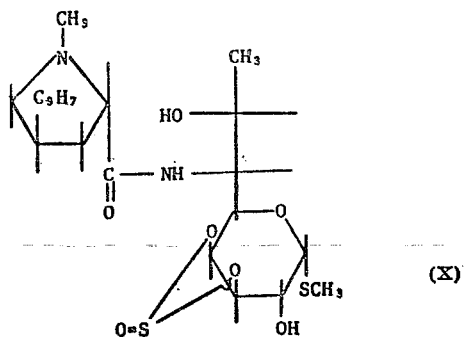

On stopping the reaction of Example 1 after 2 hrs. and before refluxing and adding a large excess (45 l.) of diethyl ether, lincomycin 3,4-O-cyclic sulfite hydrochloride monohydrate precipitates as a white solid which on alkaline hydrolysis (neutralizing to about pH 11 with NaOH) yields lincomycin and which is further characterized by the following analysis:

Analysis.—Calcd. for $C_{18}H_{32}N_2O_7S \cdot HCl \cdot H_2O$ (percent): C, 42.63; H, 6.96; Cl, 6.99; N, 5.53; S, 12.65. Found (percent): C, 42.40; H, 6.70; Cl, 7.44; N, 5.66; S, 12.84. Mol. wt. 452 (mass spec.), 452 (calcd.)

EXAMPLE 3

7(S)-chloro-7-deoxylincomycin-3,4-O-cyclic sulfite

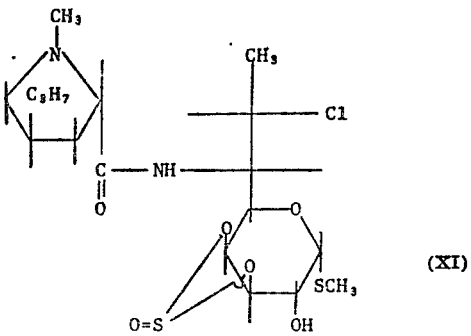

The reaction of Example 1 is stopped at the yellow solid stage and the yellow solid chromatographed on silica gel using 250 ml. portion of methanol:chloroform (1:9 v./v.). After a 3 liter forerun, fractions 9–24 are pooled, evaporated to dryness and again chromatographed over silica gel using 50 ml. portions of the same solvent system. After a 700 ml. forerun fractions 3–9 are pooled, evaporated to dryness and again chromatographed over silica gel using 50 ml. portions of the same solvent system. After a 700 ml. forerun, fractions 3–9 are pooled and evaporated to dryness yielding 7(S)-chloro-7-deoxylincomycin-3,4-O-cyclic sulfite which on alkaline hydrolysis as in Example 2 yields 7(S)-chloro-7-deoxylincomycin and which is further characterized as follows:

$[\alpha]_D^{CHCl_3}$ +171° (C. 0.802)

Mol. weight: 471 (mass. spec.), 471 (calcd.)

Analysis.—Calcd. for $C_{18}H_{31}ClN_2O_6S_2$ (percent): C, 45.89; H, 6.63; N, 5.95; S, 13.61; Cl, 7.53. Found (percent): C, 46.02; H, 6.54; N, 5.99; S, 13.20; Cl, 7.59.

EXAMPLE 4

*Bis-[7(S)-hloro-7-deoxylincomycin-3,4-O-cyclic sulfite] sulfite*

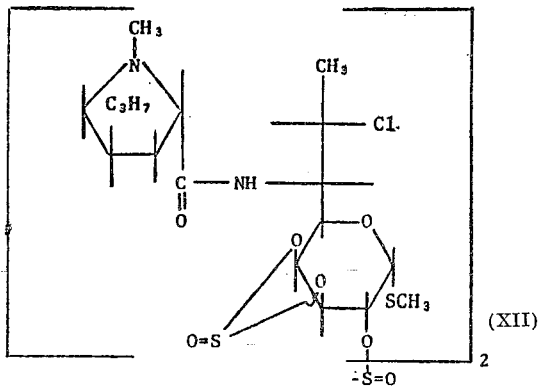

On pooling fractions 3–8 of the first chromatographic separation in Example 3 and evaporating to dryness, there is obtained bis-[7(S) - chloro - deoxylincomycin-3,4-O-cyclic sulfite] sulfite which on alkaline hydrolysis as in Example 2 yield 7(S)-chloro-7-deoxylincomycin and which is further characterized as follows: M.P. 184–186° C.

*Analysis.*—Calcd. for $C_{36}H_{60}Cl_2N_4O_{13}S_5$ (percent): C, 43.76; H, 6.12; N, 5.67; Cl, 7.18; S, 16.23. Found (percent): C, 39.93; H, 5.71; N, 5.41; Cl, 7.48; S, 16.002.

EXAMPLE 5

*7(S)-chloro-7-deoxylincomycin free base*

The process of Example 1, part A, was repeated except that methylene chloride was used in place of ether as the extracting solvent and the combined extracts were filtered and evaporated to dryness. There was obtained a 64% yield of 7(S)-chloro-7-deoxylincomycin free base as a yellow amorphous solid. 15 grams of this amorphous solid was adsorbed on 30 grams of silica gel in methylene chloride, dried, and sifted onto a 3 inch diameter column of 1500 grams of silica gel. The column was then eluted with a mixture of methanol and chloroform in the proportions of 1 to 19, respectively, in 200 ml. portions after a liter forerun. Fractions 26, 27, and 28 were pooled and evaporated to dryness yielding 1.04 grams of essentially pure 7(S)-chloro-7-deoxylincomycin free base as an amorphous solid having an antibacterial spectrum of the same scope and magnitude as the 7(S)-chloro-7-deoxylincomycin hydrochloride of Example 1.

EXAMPLE 6

*7(S)-chloro-7-deoxylincomycin C [ethyl 7-chloro-6,7,8-trideoxy-6-(trans-1-methyl - 4 - propyl-L-2-pyrrolidinecarboxamido) - 1 - thio - L - threo - α - D - galacto-octopyranoside]*

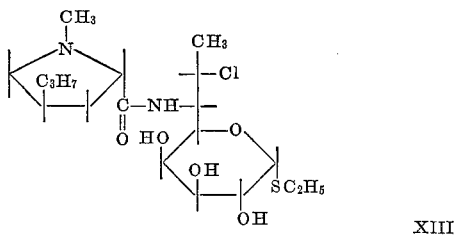

A suspension of 1 gram of lincomycin C hydrochloride (the S-demethyl-S-ethyllincomycin hydrochloride of U.S. Pats. 3,316,243 and 3,359,163) in 25 ml. of carbon tetrachloride and 4.5 ml. of thionyl chloride was stirred under nitrogen for 2 hours at 25° C. A clear solution was obtained in about 15 minutes. The reaction mixture was then heated at reflux for 2 hours and evaporated to dryness under vacuum to give a yellow solid which was dried under vacuum at 40° C. for 18 hours. The product was then dissolved in about 15 ml. of warm ethanol, made basic with sodium hydroxide as in Example 1 and diluted to 300 ml. with water. The water solution was extracted 5 times with 100 ml. portions of ether. The ether extracts were pooled, dried over magnesium sulfate, filtered, saturated with hydrogen chloride gas, and evaporated to a brown residue which on being recrystallized two times from a mixture of ethanol and ethyl acetate (dissolved in a minimum amount of ethanol and ethyl acetate added to turbidity) yielded 200 mg. of 7(S)-chloro-7-deoxylincomycin C hydrochloride as white crystals which had the same activity and spectrum as the 7(S)-chloro-7-deoxylincomycin hydrochloride of Example 1.

By substituting the ethanethiol in Example 1 of U.S. Patent 3,316,243 by other alkyl mercaptans, for example, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl mercaptans and the isomeric forms thereof; by cycloalkyl mercaptans, for example, cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl mercaptans; or by aralkyl mercaptans, for example, benzyl, phenethyl, 3-phenylpropyl, and 1-naphthylmethyl mercaptans, the corresponding alkyl, cycloalkyl, and aralkyl 6,8-dideoxy-6-(trans-1-methyl-4-propyl-L-2-pyrrolidinecarboxamido) - 1 - thio - D - erythro-α-D-galacto-octopyranosides are obtained, which on treatment with thionyl chloride by the above procedure are converted to the corresponding alkyl, cycloalkyl, and aralkyl 7-chloro-6,7,8-trideoxy - 6-(trans - 1 - methyl-4-propyl - L - 2 - pyrrolidinecarboxamido)1-thio-L-threo-α - D - galacto-octopyranosides. The compounds thus obtained (both the 6,8-dideoxy and the 7(S)-chloro-6,7,8-trideoxy compounds) wherein alkyl is propyl, butyl, pentyl, and hexyl (obtained respectively when propyl, butyl, pentyl, and hexyl mercaptans are used) are especially effective antibacterials, having the same spectrum as lincomycin.

EXAMPLE 7

*Methyl 7-chloro-6,7,8-trideoxy - 6 - (trans - 1 - alkyl-4-butyl - L - 2 - pyrrolidinecarboxamido) - 1 - thio - L-threo-α-D-galacto-octopyranosides*

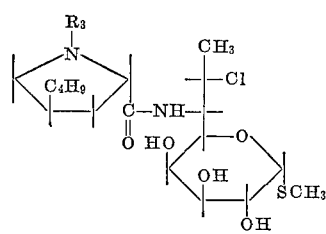

$R_3$=methyl or ethyl.

A suspension of 116 mg. of methyl 6,8-dideoxy-6-(trans-1 - ethyl - 4 - butyl - L - 2-pyrrolidinecarboxamido)1-thio-D-erythro-α-D-galacto-octopyranoside free base in 3 ml. carbon tetrachloride and 0.7 ml. of thionyl chloride was stirred at 25° C. until a clear solution was obtained (about 15 minutes) and allowed to stand at 25° C. for 2 hours. The reaction mixture was then heated at reflux for 2 hours and then evaporated to dryness under vacuum to a yellow solid which was worked up as described in Example 6. The product, however, did not crystallize so the crystallizing solvents were evaporated to yield 17 mg. of methyl 7-chloro - 6,7,8 - trideoxy - 6-(trans-1-ethyl-4-butyl-L - 2 - pyrrolidinecarboxamido) - 1 - thio - L-threo-α-D-galacto-octopyranoside hydrochloride as a tan amorphous solid which assayed 8 times the activity of lincomycin against Gram-positive bacteria and 16 to 64 times that of lincomycin against Gram-negative bacteria.

On substituting the cis epimer, there is obtained methyl 7 - chloro - 6,7,8 - trideoxy - 6 - (cis-1-ethyl-4-butyl-L-2-pyrrolidinecarboxamido) - 1 - thio - L - threo-α-D-galacto-octopyranoside hydrochloride having the same antibacterial spectrum.

On substituting the 1-methyl analogs, methyl-7-chloro-6,7,8 - trideoxy - 6 - (cis- and trans-1-methyl-4-butyl-L-2-pyrrolidinecarboxamido) - 1 - thio - L - threo-α-D-galacto-octopyranosides hydrochlorides are obtained.

The cis and trans epimers used as starting materials in the above examples were prepared according to U.S. Patent 3,380,992 starting with butyltriphenylphosphonium bromide to form an acid of Formula E and acylating α-MTL (methyl 6 - amino - 6,8 - dideoxy - 1 - thio - D-erythro-α-D-galacto-octopyranoside) with it.

By substituting the butyltriphenylphosphonium bromide by other substituted triphenylphosphonium bromides where the substituent is methyl, ethyl, propyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cyclopropyl, cyclobutyl, cyclopentyl, cyclohexyl, cycloheptyl, cyclooctyl, 2-cyclopropylethyl, and 3-cyclopentylpropyl; benzyl, phenethyl, 3-phenylpropyl, and 1-naphthylmethyl, and by substituting the α-MTL by other alkyl or by cycloalkyl or aralkyl 6-amino-6,8-dideoxy-1-thio-D-erythro-α-D-galacto - octanopyranosides wherein alkyl is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cycloalkyl is cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl; and aralkyl is benzyl, phenethyl, 3-phenylpropyl, and 1-naphthylmethyl, the corresponding alkyl, cycloalkyl, and aralkyl-6-(4-alkyl, 4-cycloalkyl, 4-aralkyl-L-2-pyrrolidinecarboxamido)-1 - thio - D - erythro-α-D-galacto-octopyranosides are obtained. For example, by substituing the 4-butyl-1-carbobenzoxy-L-proline by 4-methyl-, 4-ethyl-, 4-propyl-, 4-pentyl-, and 4-hexyl-1-carbobenzoxy-L-prolines, there are obtained methyl, ethyl, propyl, butyl, pentyl, and hexyl 6,8-dideoxy-6-(1-carbobenzoxy-4-methyl-L-2-pyrrolidinecarboxamido) - 1 - thio - D - erythro-α-D-galacto-octopyranosides; methyl, ethyl, propyl, butyl, pentyl, and hexyl 6,8-dideoxy-6-(1-carbobenzoxy-4-ethyl-L-2-pyrrolidinecarboxamido)-1 - thio - D - erythro-α-D-galacto-octopyranosides; methyl, ethyl, propyl, butyl, pentyl, and hexyl 6,8-dideoxy-6-(1-carbobenzoxy-4-propyl-L-2-pyrrolidinecarboxamido)-1-thio - D - erytho-α-D-galacto-octopyranosides; methyl, ethyl, propyl, butyl, pentyl, and hexyl 6,8-dideoxy-6-(1-carbobenzoxy - 4 - pentyl-L-2-pyrrolidinecarboxamido) - 1 - thio - D - erythro-α-D-galacto-octopyranosides; methyl, ethyl, propyl, butyl, pentyl, and hexyl 6,8-dideoxy-6-(1-carbobenzoxy - 4 - hexyl-L-2-pyrrolidinecarboxamido) - 1 - thio - D - erythro-α-D-galacto-octopyranosides; methyl, ethyl, propyl, butyl, pentyl, and hexyl 6,8-dideoxy-6-(4-methyl - L - 2-pyrrolidinecarboxamido)-1-thio - D - erythro-α-D-galacto-octopyranosides; methyl, ethyl, propyl, butyl, pentyl, and hexyl 6,8-dideoxy-6-(4-ethyl - L - 2-pyrrolidinecarboxamido)-1-thio-D-erythro-α-D-galacto-octopyranosides; methyl, ethyl, propyl, butyl, pentyl, and hexyl 6,8-dideoxy-6-(4-propyl-L-2-pyrrolodinecarboxamido) - 1 - thio - D - erythro-α-D-galacto-octopyranosides; methyl, ethyl, propyl, butyl, pentyl, and hexyl 6,8-dideoxy-6-(4-pentyl-L-2-pyrrolidinecarboxamido)-1-thio - D - erythro-α-D-galacto-octopyranosides; and methyl, ethyl, propyl, butyl, pentyl, and hexyl 6,8-dideoxy-6-(4 - hexyl - L - 2 - pyrrolidinecarboxamido)-1-thio - D - erythro-α-D-galacto-octopyranosides which on N-alkylation yield the corresponding N-methyl and N-ethyl analogs.

The procedures of the above examples can be applied to any of the intermediate stages.

Preferred starting compounds have the formula:

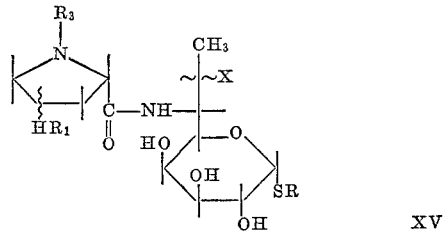

XV wherein X is hydroxy; R, $HR_1$, and $R_3$ are alkyl of not more than six carbon atoms, advantageously of not more than twelve carbon atoms in the aggregate with $R_3$ being methyl or ethyl; and the configuration is D-erythro, on treatment with thionyl chloride by the procedure, given above yield compounds according to Formula XV where X is chlorine; R, $HR_1$, and $R_3$ are alkyl as given above; and the configuration is L-threo. The 6,8-dideoxy compounds of Formula XV as characterized above are active antibacterials comparable with lincomycin. The 7-chloro-6,7,8-trideoxy compounds of Formula XV as characterized above have the same spectrum of antibacterial activity but are substantially more active. Representative compounds of Formula XV wherein X is chlorine but which have the L-threo configuration are given in the following table:

TABLE I.—COMPOUNDS OF FORMULA XV WHERE X IS CHLORINE

| | R | $HR_1$ | $R_3$ |
|---|---|---|---|
| 4A | Methyl | trans-Ethyl | Methyl |
| 4B | do | cis-Ethyl | Do. |
| 4C, (7(S)-chloro-7-deoxy-lincomycin). | do | trans-Propyl | Do. |
| 4D, (7(S)-chloro-7-deoxy-allolincomycin). | do | cis-Propyl | Do. |
| 4E, (7(S)-chloro-7-deoxy-lincomycin E). | do | trans-Propyl | Ethyl |
| 4F, (7(S)-chloro-7-deoxy-allolincomycin E). | do | cis-Propyl | Do. |
| 4G | Ethyl | trans-Propyl | Methyl |
| 4H | do | cis-Propyl | Do. |
| 4I | Methyl | trans-Butyl | Do. |
| 4J | do | cis-Butyl | Do. |
| 4K | do | trans-Propyl | Ethyl |
| 4L | do | cis-Propyl | Do. |
| 4M | Ethyl | trans-Propyl | Do. |
| 4N | do | cis-Propyl | Do. |
| 4O | Methyl | trans-Butyl | Do. |
| 4P | do | cis Butyl | Do. |
| 4Q | do | trans-Pentyl | Methyl |
| 4R | do | cis Pentyl | Do. |
| 4S | Ethyl | trans-Butyl | Ethyl |
| 4T | do | cis-Butyl | Do. |
| 4U | Methyl | trans-Pentyl | Do. |
| 4V | do | cis-Pentyl | Do. |
| 4W | Ethyl | trans-Pentyl | Methyl |
| 4X | do | cis-Pentyl | Do. |
| 4Y | Methyl | trans-Hexyl | Do. |
| 4Z | do | cis-Hexyl | Do. |
| 4AA | Butyl | trans-Propyl | Do. |
| 4AB | do | cis-Propyl | Do. |
| 4AC | Ethyl | trans-Pentyl | Ethyl |
| 4AD | do | cis-Pentyl | Do. |
| 4AE | Butyl | trans-Butyl | Do. |
| 4AF | do | cis-Butyl | Do. |
| 4AG | do | trans-Pentyl | Methyl |
| 4AH | do | cis-Pentyl | Do. |
| 4AI | Cyclohexyl | trans-Propyl | Do. |
| 4AJ | do | cis-Propyl | Do. |
| 4AK | Butyl | trans-Pentyl | Ethyl |
| 4AL | do | cis-Pentyl | Do. |
| 4AM | Pentyl | trans-Pentyl | Do. |
| 4AN | do | cis-Pentyl | Do. |

Intermediates for the preparation of the above compounds correspond to the above table where (1) X is hydroxy; (2) $R_3$ is hydrogen; (3) X is hydroxy and $R_3$ is hydrogen; (4) X is hydroxy and $R_3$ is carbobenzoxy; (5) X is chlorine and $R_3$ is carbobenzoxy; (6) X is hydroxy, $R_3$ is carbobenzoxy, and $HR_1$ and H in the 4-position are replaced by the ylidene group, $R_1$; (7) X is chlorine, $R_3$ is carbobenzoxy, and $HR_1$ and H in the 4-position are replaced by the ylidene group, $R_1$; (8) X is hydroxy, $R_3$ is hydrogen, and $HR_1$ and H in the 4-position are replaced by the ylidene group, $R_1$; (9) X is chlorine, $R_3$ is hydrogen, and $HR_1$ and H in the 4-position are replaced by the ylidene group, $R_1$; (10) X is hydroxy, and $HR_1$ and H in the 4-position are replaced by the ylidene group, $R_1$; and (11) X is chlorine and $HR_1$ and H in the 4-position are replaced by the ylidene group, $R_1$; it being understood that when X is hydroxy its configuration is D-erythro and that when X is chlorine, the configuration is L-threo.

When the lincomycin of Example 4 is replaced by alkyl, cycloalkyl, or aralkyl 6-amino-6,8-dideoxy-1-thio - D-erythro-α-D-galacto-octopyranoside there are obtained compounds of the formula:

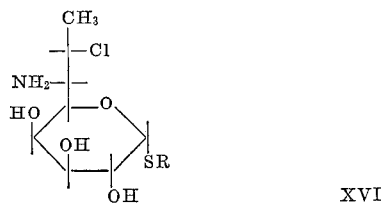

XVI wherein R is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl, or any of the isomeric forms thereof, cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl; benzyl, phenethyl, 3-phenylpropyl, and 1-naphthylmethyl which can be acylated by the procedures of Example 4 to form the corresponding 7(S)-chloro-7-deoxylincomycin analogs, for example, the compounds of Formula XII as given and illustrated above, as well as the intermediates therefor.

EXAMPLE 8

*Methyl 7 - chloro - 6,7,8 - trideoxy - 6 - (trans - 4 - butyl-L - 2 - pyrrolidinecarboxamido) - 1 - thio - L - threo-α-D-galacto-octapyranosides*

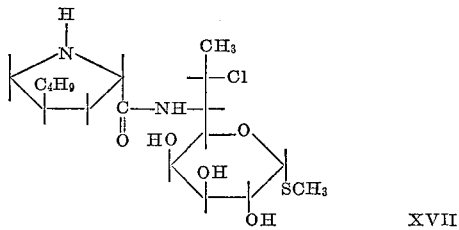

XVII

A suspension of 116 mg. of methyl, 6,8 - dideoxy-6 - (trans - 4 - butyl - L - 2 - pyrrolidinecarboxamido)-1 - thio - D - erythro - α - D - galacto-octopyranoside free base in 3 ml. carbon tetrachloride and 0.7 ml. of thionyl chloride was stirred at 25° C. until a clear solution was obtained (about 15 minutes) and allowed to stand at 25° C. for 2 hours. The reaction mixture was then heated at reflux for 2 hours and then evaporated to dryness under vacuum to give a yellow solid which was dried under vacuum at 40° C. for 18 hours. The product was then dissolved in about 15 ml. of warm ethanol, made basic with sodium hydroxide as in Example 1 and diluted to 300 ml. with water. The water solution was extracted 5 times with 100 ml. portions of ether. The ether extracts were pooled, dried over magnesium sulfate, filtered, saturated with hydrogen chloride gas, and evaporated to yield methyl 7 - chloro - 6,7,8 - trideoxy - 6 - (trans-4 - butyl - L - 2 - pyrrolidinecarboxamido) - 1 - thio-L - threo - α - D - galacto - octopyranoside hydrochloride as a tan amorphous solid which assayed at least 8 times the activity of lincomycin.

On substituting the cis epimer, there is obtained methyl 7 - chloro - 6,7,8 - trideoxy - 6 - (cis - 4 - butyl - L - 2-pyrrolidinecarboxamido) - 1 - thio - L - threo - α - D-galacto-octopyranoside hydrochloride having the same antibacterial spectrum.

The cis and trans epimers used as starting materials in the above example were prepared as given above and in U.S. Pat. 3,380,992 and separated by chromatography. The mixed isomers were dissolved in a mixture of methanol and methylene chloride (1:1) and 1.5 ml. of triethylamine added. To this solution was added 7 g. of silica gel and the solvent evaporated under vacuum leaving the antibiotic deposited on the silica gel which was sifted on top of a chromatographic column of 200 grams of silica gel packed with a solvent mixture consisting of ethyl acetate, acetone, water in a ratio of 8:4:1. The column was developed by eluting with the same solvent and 20 ml. portions were collected. The fractions were monitored by thin layer chromatography. The faster moving active fractions were essentially pure trans epimer, and the slower moving active fractions were essentially pure cis epimer. Each epimer was dissolved in a few drops of dilute hydrochloric acid and the hydrochloride precipitated by addition of acetone. In this manner, there was obtained methyl 6, 8 - dideoxy - 6 - (trans - 4 - butyl-L - 2 - pyrrolidinecarboxamido) - 1 - thio - D - erythro-α - D - galacto - octopyranoside hydrochloride, and methyl 6,8 - dideoxy - 6 - (cis - 4 - butyl - L - 2 - pyrrolidinecarboxamide) - 1 - thio - D - erythro - α - D-galacto-octopyranoside hydrochloride.

EXAMPLE 9

*Methyl 7 - chloro - 6,7,8 - trideoxy - 6 - (trans - 1 - methyl-4 - propyl - L - 2 - pyrrolidinecarboxamido) - 1 - thio-D - erythro - α - D - galacto - octopyranoside(7(R)-chloro-7-deoxylincomycin)*

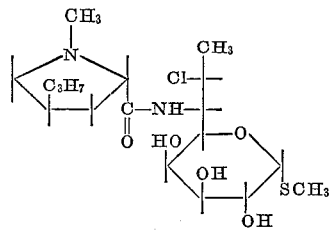

XVIII 7-epilincomycin hydrochloride (0.85 g.) was suspended in 17 ml. of carbon tetrachloride. Thionyl chloride (4.5 ml.) was added and the reaction mixture stirred at 25° for 15 minutes. The solid dissolved to give a clear, colorless solution. The reaction was then heated at reflux for 2 hours, cooled to 25°, evaporated under vacuum to a solid yellow residue. This crude product was dissolved in 10 ml. of ethanol, made basic with 0.1 N sodium hydroxide, diluted to 500 ml. with water and extracted four times with 50-ml. portions of chloroform. The combined chloroform extracts were back-washed two times with 20-ml. portions of saturated sodium chloride solution, filtered and evaporated under vacuum. The solid residue was slurried with 500 ml. of ether, filtered and hydrogen chloride gas passed into the filtrate. The solid precipitate was collected, dissolved in 3 ml. of ethanol, and re-precipitated by the addition of ether.

The solid was collected and dried. A 30% yield (270 mg.) of 7(R)-chloro-7-deoxylincomycin assaying about 2 to 3 times the activity of lincomycin was obtained. TLC on silica gel (MeOH:CHCl₃ system, 1:6 v./v.) showed one spot having an Rƒ of 0.44 as compared with an Rƒ of 0.52 for 7(S)-chloro-7-deoxylincomycin.

By substituting 7-epilincomycin in this example by 7 - epilincomycin analogs of Formula II wherein Z, R, $R_1$, $R_2$, $R_3$ of the Ac group are as given and illustrated above, the corresponding 7(R)-chloro-7-deoxylincomycin analogs of the formula

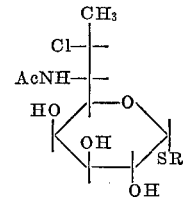

XIX wherein Z, R, R₁, R₂ and R₃ of the Ac group are as given and illustrated above, are obtained. All the compounds that have been described above, therefore, have their counterpart in the opposite configuration, that is, the configuration derived from the 7-epi form. As an inversion is effected by the substitution of the 7-hydroxy group by chlorine, the epi-compounds, which have the L-threo configuration, are inverted to the D-erythro configuration. Thus the D-erythro and the L-threo forms are obtained depending on whether the normal lincomycins (D-erythro) or the epi-lincomycins (L-threo) are used.

EXAMPLE 10

*7(S)-chloro-7-deoxylincomycin hydrochloride*

Lincomycin hydrochloride (10 g.–0.0226 mole), 200 ml. carbon tetrachloride, and 10 ml. SOCl₂ were stirred and heated at reflux for 4 hours. The reaction mixture was cooled to 25° C. and filtered. The yellow solid was dried under vacuum and then dissolved in about 10 ml. of boiling ethanol. Ethyl acetate was added to turbidity and the solution allowed to cool. The crystals of 7(S)-chloro-7-deoxylincomycin hydrochloride thus formed were recovered in a yield of about 43%.

While the processes of the invention have been described with reference to the preparation of specific compounds, it is to be understood that the process is broadly applicable to compounds of Formula II wherein Ac and R are radicals which are non-reactive with thionyl chloride. Thus, in the broad process according to the invention, Ac can be hydrogen or any acyl that is non-reactive with thionyl chloride and R can be any alkyl, irrespective of the number of carbons, or any other radical, for example, aralkyl like benzyl, naphthylmethyl, and benzhydryl, or like hydrocarbon radicals that are non-reactive with thionyl chloride.

We claim:

1. The process of making compounds of the formula:

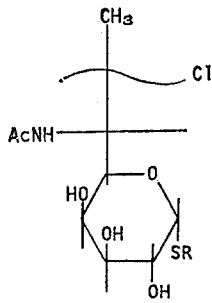

wherein R and Ac are as given below, the step of replacing the 7-hydroxy group with chlorine by heating a compound of the formula:

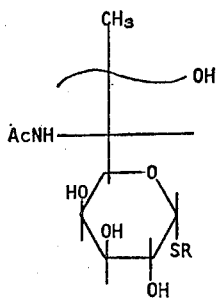

with thionyl chloride thereby forming a cyclic sulfite of the formula:

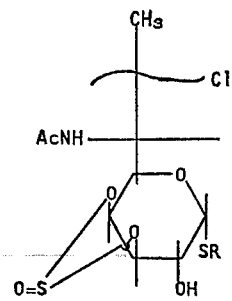

wherein Ac is hydrogen or carboxylic acid acyl non-reactive with thionyl chloride and R is the radical of a mercaptan non-reactive with thionyl chloride followed by removal by solvolysis of cyclic sulfite group.

2. A process according to claim 1 wherein R is alkyl of not more than 20 carbon atoms and Ac is hydrogen or the acyl radical of a 4-substituted-L-2-pyrrolidinecarboxylic acid of the formula:

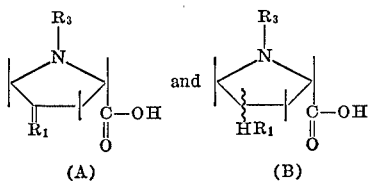

wherein R₁ is alkylidene of not more than 20 carbon atoms, cycloalkylidene of from 3 to not more than 8 carbon atoms, and aralkylidene of not more than 12 carbon atoms; or R₃ is methyl or ethyl.

3. A process according to claim 2 wherein Ac is acyl as defined in claim 2.

4. A process according to claim 2 wherein Ac is hydrogen and the compound is in the form of the hydrochloride salt.

5. A process according to claim 1 wherein R is alkyl of not more than 20 carbon atoms and Ac is the acyl radical of a 4-substituted-L-2-pyrrolidinecarboxylic acid of the formula:

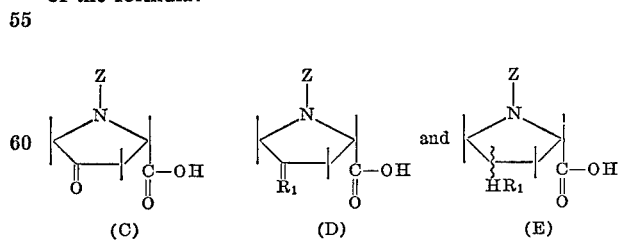

wherein R₁ is alkylidene of not more than 20 carbon atoms, cycloalkylidene of from 3 to not more than 8 carbon atoms, and aralkylidene of not more than 12 carbon atoms; and Z is a protective group removable by hydrogenolysis or solvolysis.

6. A process according to claim 5 in which Z is hydrocarbyloxycarbonyl, trityl, diphenyl(p - methoxyphenyl)methyl, bis - (p - methoxyphenyl)phenylmethyl, benzyl, or p-nitrobenzyl.

7. A compound of the formula:

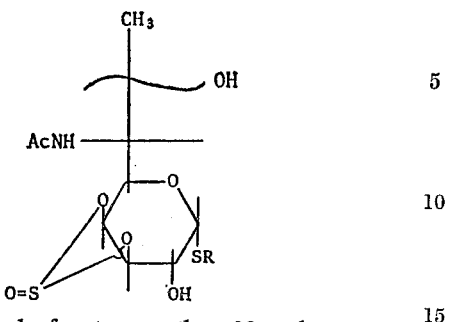

wherein R is alkyl of not more than 20 carbon atoms and Ac is hydrogen or an acyl radical of a 4-substituted-L-2-pyrrolidinecarboxylic acid of the formula:

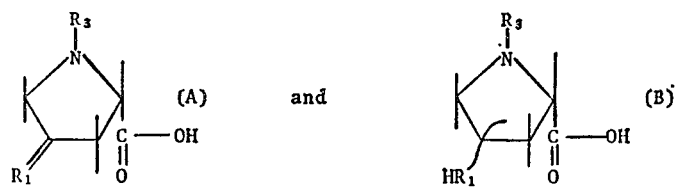

wherein $R_1$ is alkylidene of not more than 20 carbon atoms, cycloalkylidene of from 3 to not more than 8 carbon atoms, and aralkylidene of not more than 12 carbon atoms; or $R_3$ is methyl, or ethyl.

8. Lincomycin 3,4-O-cyclic sulfite.

9. A compound of the formula:

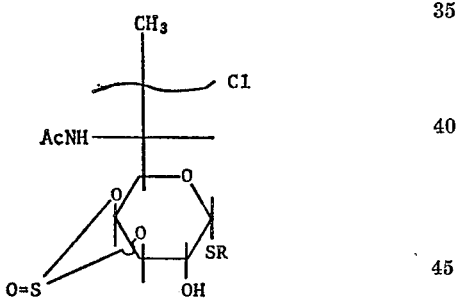

wherein R and Ac are as given in claim 7.

10. 7(S) - chloro - 7 - deoxylinocmycin - 3,4, - O-cyclic sulfite.

11. A compound of the formula:

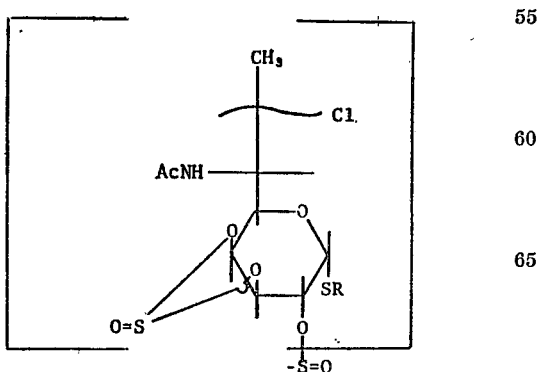

wherein R and Ac are as given in claim 7.

12. Bis - [7(S) - chloro - 7 - deoxylincomycin - 3,4-O-cyclic sulfite] sulfite.

13. A process for making compounds of the formula:

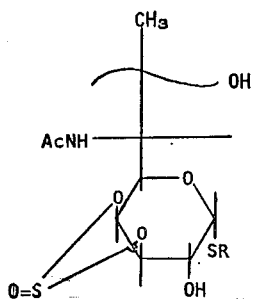

which comprises mixing a compound of the formula:

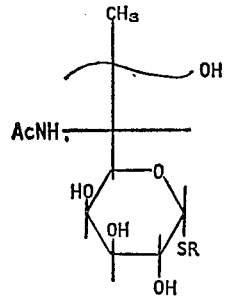

with thionyl chloride without heating wherein Ac is hydrogen or carboxylic acid acyl non-reactive with thionyl chloride and R is the radical of a mercaptan non-reactive with thionyl chloride.

14. A process for making compounds of the formula:

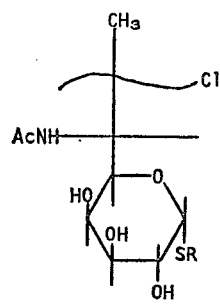

which comprises exposing a compound of the formula:

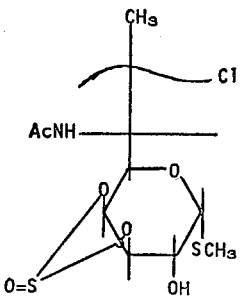

to aqueous alkali at a pH of about 11 wherein Ac is hydrogen or a carboxylic acid acyl non-reactive with thionyl chloride and R is a radical of a mercaptan non-reactive of thionyl chloride.

15. A process according to claim 13 wherein R is alkyl of not more than 20 carbon atoms and Ac is hydrogen or the acyl radical of a 4-substituted - L - 2 - pyrrolidinecarboxylic acid of the formula:

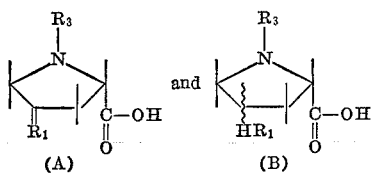

wherein $R_1$ is alkylidene of not more than 20 carbon atoms, cycloalkylidene of from 3 to not more than 8 carbon atoms, and aralkylidene of not more than 12 carbon atoms; or $R_3$ is methyl or ethyl.

16. A process according to claim 15 wherein Ac is acyl as defined in claim 15.

17. A process according to claim 1 wherein R is alkyl of not more than 20 carbon atoms and Ac is the acyl radical of a 4-substituted-L-2-pyrrolidinecarboxylic acid of the formula:

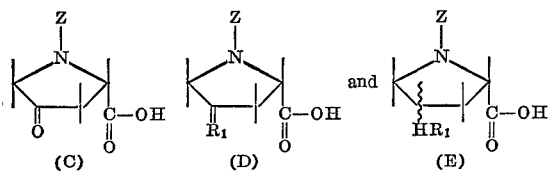

wherein $R_1$ is alkylidene of not more than 20 carbon atoms, cycloalkylidene of from 3 to not more than 8 carbon atoms, and aralkylidene of not more than 12 carbon atoms; and Z is a protective group removable by hydrogenolysis or solvolysis.

18. A process according to claim 17 in which Z is hydrocarbyloxycarbonyl, trityl, diphenyl(p - methoxyphenyl)methyl, bis - (p - methoxyphenyl)phenylmethyl, benzyl, or p-nitrobenzyl.

19. A process according to claim 14 wherein R is alkyl of not more than 20 carbon atoms and Ac is hydrogen or the acyl radical of a 4-substituted-L-2-pyrrolidinecarboxylic acid of the formula:

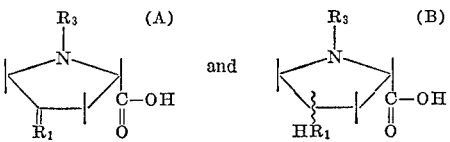

wherein $R_1$ is alkylidene of not more than 20 carbon atoms, cycloalkylidene of from 3 to not more than 8 carbon atoms, and aralkylidene of not more than 12 carbon atoms; or $R_3$ is methyl or ethyl.

20. A process according to claim 19 wherein Ac is acyl as defined in claim 19.

21. A process according to claim 1 wherein R is alkyl of not more than 20 carbon atoms and Ac is the acyl radical of a 4-substituted-L-2-pyrrolidinecarboxylic acid of the formula:

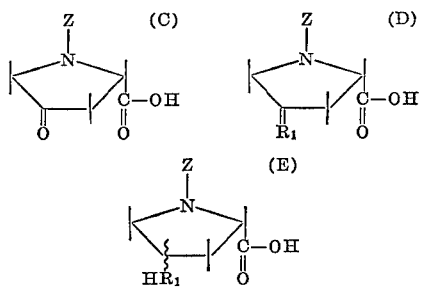

wherein $R_1$ is alkylidene of not more than 20 carbon atoms, cycloalkylidene of from 3 to not more than 8 carbon atoms, and aralkylidene of not more than 12 carbon atoms; and Z is a protective group removable by hydrogenolysis of solvolysis.

22. A process according to claim 21 in which Z is hydrocarbyloxycarbonyl, trityl, diphenyl(p - methoxyphenyl)methyl, bis - (p - methoxyphenyl)phenylmethyl, benzyl, or p-nitrobenzyl.

References Cited

UNITED STATES PATENTS

| | | | |
|---|---|---|---|
| 3,264,282 | 8/1966 | Schroeder | 260—210 |
| 3,435,025 | 3/1969 | Birkenmeyer | 260—210 |

ELBERT L. ROBERTS, Primary Examiner

J. R. BROWN, Assistant Examiner

U.S. Cl. X.R.

252—357; 260—2.5, 999